United States Patent
Crosland et al.

(10) Patent No.: US 7,657,689 B1
(45) Date of Patent: Feb. 2, 2010

(54) METHODS AND APPARATUS FOR HANDLING RESET EVENTS IN A BUS BRIDGE

(75) Inventors: Andrew Crosland, Aylesbury (GB); Andrew Draper, Chesham (GB)

(73) Assignee: Altera Corporation, San Jose, CA (US)

( * ) Notice: Subject to any disclaimer, the term of this patent is extended or adjusted under 35 U.S.C. 154(b) by 78 days.

(21) Appl. No.: 10/681,860

(22) Filed: Oct. 7, 2003

(51) Int. Cl.
    G06F 13/36 (2006.01)
    G06F 13/00 (2006.01)
    H03L 7/00 (2006.01)

(52) U.S. Cl. .................. 710/310; 710/305; 327/144

(58) Field of Classification Search .............. 710/35, 710/62, 65, 305, 310, 10, 58, 105, 306, 311, 710/313–315; 709/253; 713/1; 257/530; 711/167; 714/3, 56; 327/144; 375/354
See application file for complete search history.

(56) References Cited

U.S. PATENT DOCUMENTS

| | | | |
|---|---|---|---|
| 5,815,647 A * | 9/1998 | Buckland et al. | 714/3 |
| 6,035,346 A * | 3/2000 | Chieng et al. | 710/10 |
| 6,055,598 A * | 4/2000 | Lange | 710/310 |
| 6,087,867 A * | 7/2000 | Holm | 327/144 |
| 6,108,778 A * | 8/2000 | LaBerge | 713/1 |
| 6,134,656 A * | 10/2000 | LaBerge | 713/1 |
| 6,247,082 B1 * | 6/2001 | Lo et al. | 710/105 |
| 6,253,250 B1 * | 6/2001 | Evans et al. | 709/253 |
| 6,338,127 B1 * | 1/2002 | Manning | 711/167 |
| 6,393,502 B1 * | 5/2002 | Meyer et al. | 710/58 |
| 6,552,410 B1 * | 4/2003 | Eaton et al. | 257/530 |
| 6,662,320 B1 * | 12/2003 | Cabezas et al. | 714/56 |
| 6,687,773 B1 * | 2/2004 | Stewart et al. | 710/65 |
| 6,715,019 B1 * | 3/2004 | Benson et al. | 710/305 |
| 6,725,301 B1 * | 4/2004 | Gholami et al. | 710/62 |
| 6,748,039 B1 * | 6/2004 | Bates | 375/354 |
| 6,996,659 B2 * | 2/2006 | Lupien et al. | 710/315 |
| 7,062,589 B1 * | 6/2006 | Crosland | 710/306 |
| 7,165,172 B1 * | 1/2007 | Hamilton et al. | 713/1 |
| 2002/0015565 A1 * | 2/2002 | Imamura | 385/88 |
| 2004/0205267 A1 * | 10/2004 | Holm et al. | 710/35 |
| 2005/0036577 A1 * | 2/2005 | Sweet | 375/354 |

OTHER PUBLICATIONS

PCI Local Bus Specification, PCI Special Interest Group. Dec. 18, 1998. Revision 2.2, pp. 1-5, 189-220.*
Weiss, Ray. "Advanced Microprocesor Bus Architecture (AMBA) Bus System". Mar. 5, 2001. Electronic Design. ED Online ID #4165. Retrieved from Internet Feb. 23, 2009. <http://electronicdesign.com/Articles/Print.cfm?AD=1&ArticleID=4165>.*

* cited by examiner

*Primary Examiner*—Thomas J Cleary
(74) *Attorney, Agent, or Firm*—Weaver Austin Villeneuve & Sampson LLP

(57) ABSTRACT

Methods and apparatus are provided for handling reset events in a bus bridge. A system on a programmable chip includes master components and slave components supporting various bus protocols. Bus bridges allow components using different bus protocols to interact. Reset of a distinct subset of programmable chip components or the synchronization of reset signals across disparate clock domains is allowed by effectively handling reset related signals at a bus bridge.

24 Claims, 8 Drawing Sheets

METHODS AND APPARATUS FOR HANDLING RESET EVENTS IN A BUS BRIDGE

BACKGROUND

1. Field of the Invention

The present invention relates to handling reset events in a bus bridge. In one example, the techniques of the present invention provide mechanisms for allowing either side of the bus bridge to reset independently without violating bus protocols.

2. Description of the Prior Art

A number of benefits have spurred efforts towards higher levels of system integration on a programmable chip. Integrating separate components such as processors and peripherals on a single integrated circuit allows compact system size, low power requirements, durability, high-performance, and low unit costs. Further, programmable logic allows custom logic in an integrated circuit while avoiding time-consuming and expensive engineering processes associated with designing ASICs.

Implementing a system on a programmable chip typically entails connecting various master components and slave components. In many instances, various master component and slave component support different bus protocols. In order to facilitate the integration of these components on the programmable chip, bridges are provided to connect components running disparate bus protocols. In one example, a bus bridge is provided between a processor using a bus protocol in a first clock domain and various peripherals using a different bus protocol in a second clock domain.

Many programmable logic chips can be reconfigured with a new design relatively quickly. In doing so, a component may require reconfiguration. However, such reconfiguration often requires the resetting of other components in the system. Depending on the state of activity (e.g., idle versus running) of the components on both sides of the bridge, the process of resetting safely a required component is difficult. Conventional reset techniques involve performing a system wide reset that would simultaneously place substantially all system components in a known state. However, a system wide reset may be unnecessarily disruptive. One example of a programmable chip having components supporting different bus protocols is the Excalibur line of devices available from Altera Corporation of San Jose, Calif. The Excalibur line of devices includes bidirectional bridges connecting hard coded logic to programmable logic components. The bidirectional bridges are synchronous to the clock domain that drives them; however, the embedded processor domain and the PLD domains are asynchronous. As such, the clock domain for each side of the bridge can be optimized for performance. However, managing system signals such as reset signals on a programmable chip with components running disparate bus protocols are often difficult.

Consequently, it is therefore desirable to provide improved methods and apparatus for handling reset events. More specifically, it is desirable to provide techniques and mechanisms for efficiently and effectively handling reset events.

SUMMARY

Methods and apparatus are provided for handling reset events in a bus bridge. A system on a programmable chip includes master components and slave components supporting various bus protocols. Bus bridges allow components using different bus protocols to interact. Reset of a distinct subset of programmable chip components or the synchronization of reset signals across disparate clock domains is allowed by effectively handling reset related signals at a bus bridge.

One aspect of the present invention involves a method for handling resets at a bus bridge. The method includes (1) receiving a reset signal at a bus bridge coupling a master component supporting a master component bus protocol to a slave component supporting a slave component bus protocol, the reset signal associated with a reset of the slave component; and (2) responding to a transaction from the master component to the slave component with a bus protocol compliant signal after the reset signal is received, wherein responding with a bus protocol compliant signal allows the master component to continue operating while the slave component is being reset.

In one embodiment, the reset signal is received at a bus bridge master interface. In another embodiment, a bus bridge slave interface responds with the bus protocol compliant signal. Generally, the bus protocol compliant signal is an AHB bus error signal. Yet in another embodiment, the master component bus protocol is the AHB protocol operating in a master component clock domain whereas the slave component bus protocol is the AHB protocol operating in a slave component clock domain different from the master component clock domain. Alternatively, the slave component bus protocol is the PI protocol. In this embodiment, the method further includes synchronizing the reset signal to the master component clock domain. In addition, it includes setting the master component to an idle state and also setting the bus bridge slave interface in an idle state while the slave component is being reset.

Another aspect of the present inventions involves an apparatus such as a bus bridge for handling resets. The bus bridge includes a bus bridge master interface where the bus bridge master interface is coupled to a slave component. The bus bridge master interface being configured to receive a reset signal associated with a reset of the slave component on a first side of the bus bridge. The bus bridge also includes a bus bridge slave interface where the bus bridge slave interface is coupled to a master component. The bus bridge slave interface being configured to interact with the master component on a second side of the bus bridge such that the slave component is reset while the master component continues operating without violating bus protocols.

In one embodiment, the first side corresponds to a first clock domain and the second side corresponds to a second clock domain where the first and second clock domains are different from each other. The bus bridge further includes synchronization logic for synchronizing the reset signal with the second clock domain such that the master component and the bus bridge slave interface transition to an idle state. The synchronization logic being configured for receiving a synchronization signal that is a result of the reset signal; for receiving a clock input that is associated with the second clock domain; and for outputting an initialization idle signal when the received clock input indicates that the second clock domain is running. Also, the bus bridge slave interface is configured for receiving the initialization idle signal; and for outputting a component idle signal to the master component in response to receiving the initialization idle signal, the component idle signal being used to trigger the master component to transition to an idle state. In addition, the bus bridge slave interface is further configured for outputting a confirmation idle signal that is used to indicate when the master component has reached an idle state.

Yet, another aspect of the invention pertains to computer program products including a machine readable medium on which is stored program instructions, tables or lists, and/or data structures for implementing a method as described above. Any of the methods, tables, or data structures of this invention may be represented as program instructions that can be provided on such computer readable media. Still other aspects relate to systems including a processor and memory for implementing a method as described above. Any of the method or techniques of this invention may be implemented on a system having a processor and memory.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION

Introduction

Figure 1:
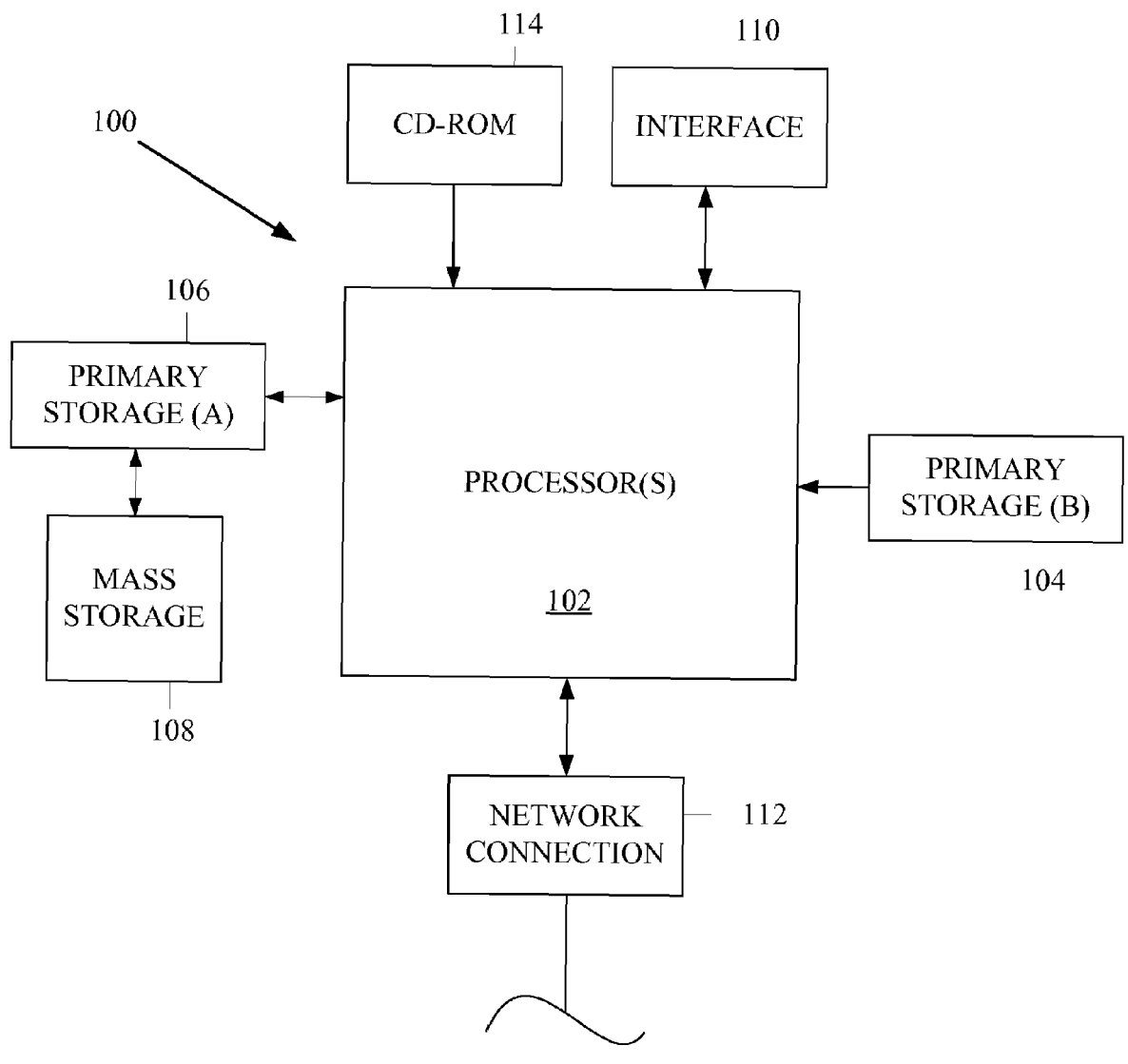
FIG. 1 is a diagrammatic representation showing a typical computer system that, when appropriately configured or designed, can serve as an apparatus of this invention.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Aspects of this invention provide a bus bridge device having functionality for handling reset of components on one side of a bus bridge without adversely affecting the other side (e.g., locking up components or violating a bus protocol). A reset signal is received on a first side such that a component associated with the first side is reset while a component associated with a second side of the bus bridge continues to operate without adverse effects. In one example, the first side corresponds to a first clock domain and the second side corresponds to a second clock domain. Another aspect of the present invention provides a bus bridge including logic for synchronizing a reset signal through different clock domains such that a component associated with a first side of the bus bridge is reset effectively without locking up components or violating bus protocols associated with a second side of the bus bridge.

Implementing a system on a programmable chip typically includes the usage of electronic design automation (EDA) systems. For context, the electronic design automation process may be divided, roughly, into four stages: 1) Design Entry; 2) Design Compilation; 3) Design Verification; 4) Device Programming. The design entry stage normally involves a user (e.g., designer) entering a high level behavioral or functional representation of an electronic design. Design entry by the user may be done using different methods, two of which are a graphical design entry (e.g., schematic design editor) and a text design entry (e.g., hardware description language). In many EDA systems, the output of the design entry stage is a netlist that is derived from the design as entered by the user. Frequently, the netlist is produced from a Hardware Design Language (HDL) representation of the design. Often that representation is provided in a Register Transfer Language (RTL), which specifies some level of hardware design.

Regardless of how the netlist is derived, it may be used for implementing a system on a programmable chip with a bus bridge design in accordance with this invention. After a netlist has been validated using a design rule checking system, it may be compiled to produce a configuration file describing the programming of a hardware device (stage 2). During the design verification stage (stage 3), the design is tested by performing functional and/or timing simulations. It should be noted that the design verification stage may be done at anytime throughout the electronic design process and may go through several iterations before a final electronic design is achieved. Finally, the device programming stage (stage 4) entails programming the hardware device with a final configuration file.

From the above discussion, the meanings of certain relevant terms should be reasonably clear. However, to further illuminate certain concepts pertinent to this invention, the following definitions are provided. These definitions are provided to assist in understanding the concepts presented in the specification. They do not necessarily limit the scope of this invention.

The term "electronic design" generically refers to the logical structure of an electronic device such as an integrated circuit. It may be implemented on hardware (usually referred to herein generically as a "target hardware device"). During the design and development effort, an electronic design may exist in various states or stages. These may include a high level Boolean representation (encoded in a hardware design language for example), a schematic or circuit representation, or any other form representing the logical arrangement of a device. It may include other facets such as floor-plan constraints, wave-form constraints, timing constraints, fitting constraints, etc. At the gate level, it may exist as a netlist (whether synthesized or not) prior to placement on a target hardware device. It may even include completed place and route assignments.

A "netlist" is used to describe the functionality and connectivity of a digital circuit design that can be implemented on a programmable logic device or other target hardware device. The netlist is represented as a hierarchical collection of gates, state machines, high level constructs such as counters or adders, or any other means of defining a collection of outputs based on a collection of inputs. The nodes of the netlist (gates, state machines, etc.) are connected together via nets. Each of these nets is associated with a named digital signal. A netlist may be synthesized to remove redundant logic, simplify the gate layout provided by a user, etc.

When in the form of a netlist (such as a synthesized netlist), an electronic design may be divided into "logic cells" (sometimes called "hardware cells" herein) representing various logic functions within the electronic design. During compilation, these logic cells are mapped onto physical structures known as "logic elements" which reside on the target hardware device. Logic elements may include various types of programmable logic including look up tables (LUTs), product terms, memory blocks, dedicated arithmetic elements such as multipliers and accumulators, etc. The criteria for mapping gates or other design features into logic cells result from the requirement that the resulting logic cell must fit into one logic element. An example of a logic cell is a collection of gates (connected in some way and implemented in a look-up table) combined with a register and configured to implement a multiplexer.

A "compiler" takes a high level representation (e.g., a netlist) as an input, and using a component database puts the information necessary for layout (hardware implementation) and sometimes verification and/or simulation into an object file or files. A simulator takes the object file(s) and simulation models, and generates a set of simulation results, acting on instructions, initial conditions, and input signal values provided to it either in the form of a file or user input. When compilation is complete, a target hardware device is programmed (or otherwise constructed) with the compiled design.

In the context of this invention, a target hardware device is any hardware device on which an EDA designed device is implemented. It may include memory elements, registers, and/or dedicated functions such as processor cores and DSP blocks. The logic elements, memory elements, and registers are typically the fundamental elements of the hardware device's architecture on which different electronic design components can be defined. These elements may be grouped into blocks such that each discrete element is associated with a block (or other arbitrary containment entity). There may be higher-level organization in the device such that logic blocks are grouped into rows or some other arbitrary entity.

Target hardware devices may be custom integrated circuits (e.g., ASICs), custom configurations for programmable integrated circuits, or general purpose, mass-produced integrated circuits. Many embodiments of the invention employ programmable devices such as programmable logic devices (PLDs) programmable by a user to produce a custom design for that user. Programmable logic devices are integrated circuits that may be programmed to perform a desired function and include programmable logic arrays (PLAs), programmable array logic (PAL), field programmable gate arrays (FPGAs), complex programmable logic devices (CPLDs), and a wide variety of other logic and memory devices that may be programmed. Altera's Stratix™ devices are examples of PLD target hardware devices. They contain logic elements, memory, and dedicated parallel multiplier circuitry (denoted DSP Blocks).

Apparatus and Environment

Generally, embodiments of the present invention employ various processes or methods involving data stored in or transferred through one or more computing devices. Embodiments of the present invention also relate to an apparatus for performing these operations. Such apparatus may be specially constructed to implement a system on a programmable chip having a bus bridge according to the techniques of the present invention, or it may be a general-purpose computer selectively activated or reconfigured by a computer program and/or data structure stored in the computer. The processes presented herein are not intrinsically related to any particular computer or other apparatus. Various general-purpose machines may be used with programs written in accordance with the teachings herein, or it may be more convenient to construct a more specialized apparatus to perform the required method operations. A particular structure generally representing a variety of these machines will be described below.

In addition, embodiments of the present invention relate to computer readable media or computer program products that include program instructions and/or data (including data structures) for performing various computer-implemented operations. Examples of computer-readable media include, but are not limited to, magnetic media such as hard disks, floppy disks, and magnetic tape; optical media such as CD-ROM disks; magneto-optical media; semiconductor memory devices, and hardware devices that are specially configured to store and perform program instructions, such as read-only memory devices (ROM) and random access memory (RAM). The data and program instructions of this invention may also be embodied on a carrier wave or other transport medium (including electronic or optically conductive pathways).

Examples of program instructions include low-level code, such as that produced by a compiler, as well as higher-level code that may be executed by the computer using an interpreter. Further, the program instructions may be machine code, source code and/or any other code that directly or indirectly controls operation of a computing machine in accordance with this invention. The code may specify input, output, calculations, conditionals, branches, iterative loops, etc.

FIG. 1 illustrates, in simple block format, a typical computer system that can serve as a computational apparatus for implementing a system on a programmable chip. The computer system 100 includes any number of processors 102 (also referred to as central processing units, or CPUS) that are coupled to storage devices including primary storage 106 (typically a random access memory, or RAM), primary storage 104 (typically a read only memory, or ROM). In the depicted embodiment, primary storage 104 acts to transfer data and instructions uni-directionally to the CPU and primary storage 106 is used typically to transfer data and instructions in a bi-directional manner. Both of these primary storage devices may include any suitable computer-readable media such as those described above. A mass storage device 108 is also coupled bi-directionally to primary storage 106 and provides additional data storage capacity and may include any of the computer-readable media described above. Mass storage device 108 may be used to store programs, data and the like and is typically a secondary storage medium such as a hard disk. Frequently, such programs, data and the like are temporarily copied to primary memory 106 for execution on CPU 102. It will be appreciated that the information retained within the mass storage device 108, may, in appropriate cases, be incorporated in standard fashion as part of primary storage 104. A specific mass storage device such as a CD-ROM 114 may also pass data uni-directionally to the CPU or primary storage.

CPU 102 is also coupled to an interface 110 that connects to one or more input/output devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 102 optionally may be coupled to an external device such as a database or a computer or telecommunications network using an external connection as shown generally at 112. With such a connection, it is contemplated that the CPU might receive information from the network, or might output information to the network in the course of performing the method steps described herein.

In accordance with this invention, a system such as computer system 100 is used as an electronic design automation tool that provides a system level design interface that facilitates design of test hardware having embedded logic analyzers. Preferably, system 100 also provides system level analysis capabilities and, optionally, one or more of a synthesizer, a compiler, and a target device programmer. Information and programs, including configuration information files and other files can be provided via a network connection 112 for downloading by the designer. Alternatively, such information, programs and files can be provided to a designer on a storage device.

Exemplary Components for Handling Reset Events in a Bus Bridge

Figure 2:
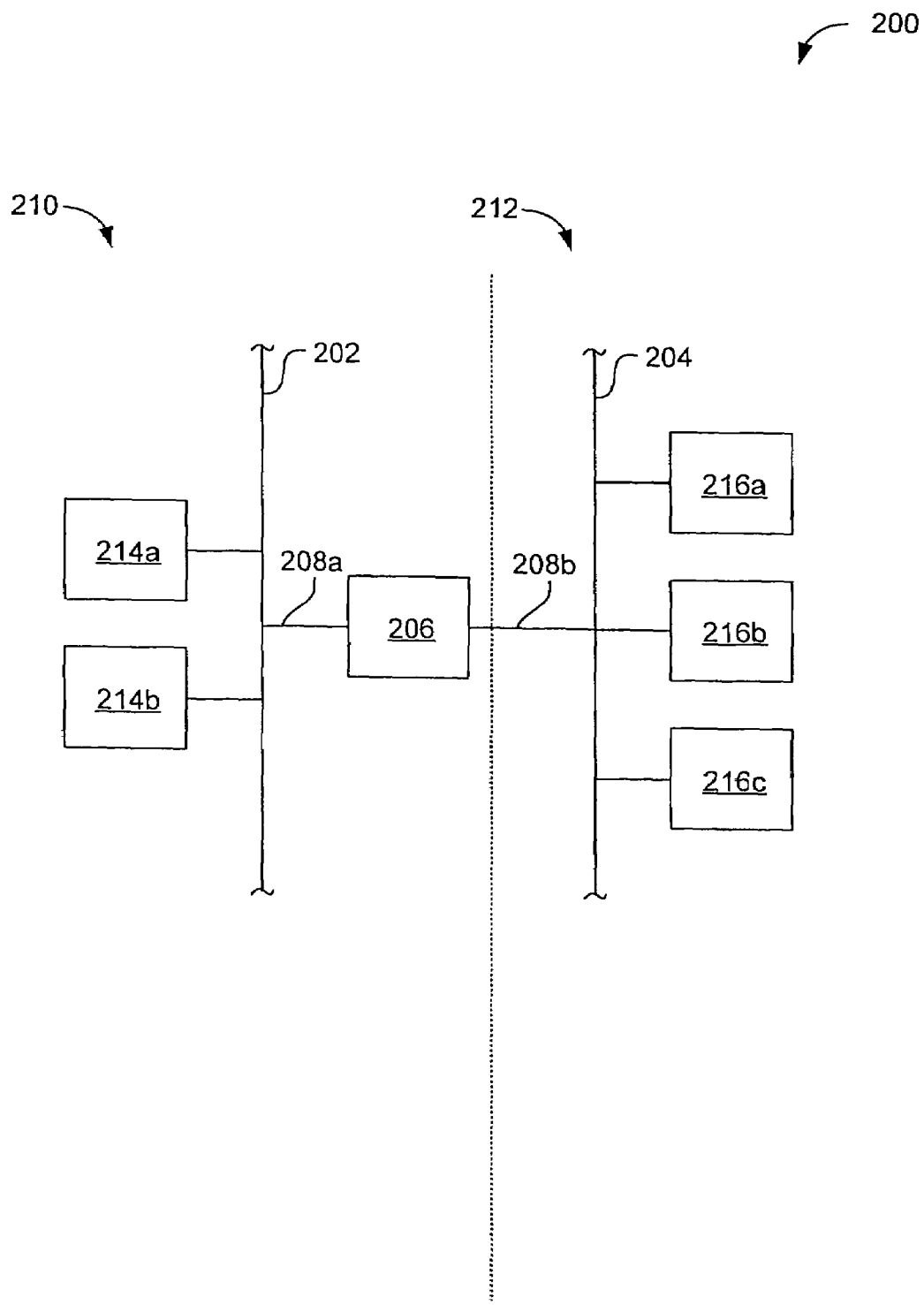
FIG. 2 is a diagrammatic representation showing a system with a bus bridge connecting two separate buses with independent clocks.

FIG. 2 is a diagrammatic representation showing a system 200 with a bus bridge connecting two disparate buses. System 200 can be any portion of a programmable logic chip or a computational system. System 200 includes disparate buses 202 and 204 connected by bus bridge 206. Any logic or mechanism operable to connect disparate buses is referred to herein as a bus bridge. A bus bridge is also referred to as a host bridge. In one example, a bus 202 runs a bus protocol such as Peripheral Interconnect (PI) while bus 204 runs a bus protocol such as AMBA High-Speed Bus (AHB). In another example, bus 202 runs AHB in a first clock domain 210 while bus 204 runs PI in a second clock domain 212. The clock domains may be either synchronous or asynchronous. Coupled to bus 202 are master components 214a and 214b. Likewise, coupled to bus 204 are slave components 216a, 216b, and 216c. Master and slave components may be any component suitable for implementation on the system. In one embodiment of the present invention, the master components may include a processor core, a hard logic device, a configuration logic master, an interrupt controller, or a watchdog timer. The slave components may include a programmable logic device, a hard logic device, a reset module, a timer, or a phase lock loop module.

In connecting bus 202 and bus 204 together, a bridge 206 is provided along path 208 (e.g., 208a and 208b). In one example, bridge 206 is configured to facilitate communication between the master components (i.e., 214a, 214b) and the slave components (i.e., 216a, 216b, and 216c). Although bridge 206 is shown located within clock domain 210, it can be appreciated by those skilled in the art that bridge 206 can be located within clock domain 212 or within any other independent clock domain. Furthermore, bridge 206 can connect buses in which other bridges are also connected to. That is, any of the buses (e.g., 202, 204) can have more than one bridge connecting it to other buses with corresponding components. In effect, a cascade of bus-bridge-bus combinations can take place. It is important to note that bus 202 may have either one or a plurality of master components coupled to it. Similarly, bus 204 may have either one or a plurality of slave components coupled to it. Alternately, bus 202 may also have slaves and bus 204 may have other masters.

Figure 3:
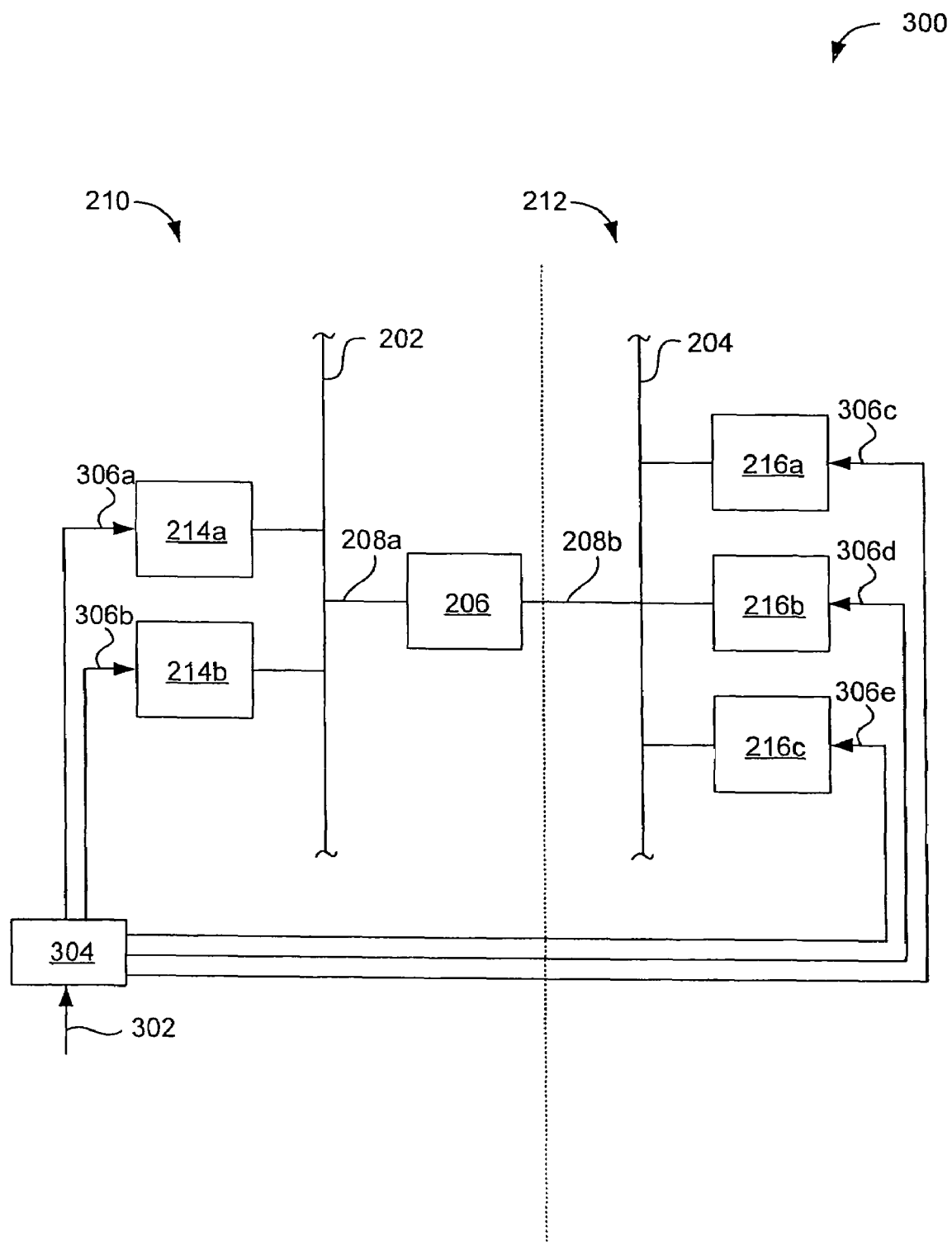
FIG. 3 is a diagrammatic representation showing a reset mechanism implemented on the system depicted in FIG. 2.

FIG. 3 is a diagrammatic representation showing a reset mechanism implemented on system 200 depicted in FIG. 2. As shown, a reset signal 302 is provided as input into a reset generator 304. Reset signal 302 can be derived in many different ways. For example, a user, a predefined algorithm, a device, or an event can initiate the reset signal. On the other hand, reset generator 304 may be any logic or mechanism configured for synchronously releasing a signal 306 (e.g., 306a, 306b, 306c, 306d, 306e) to each of master components 214a and 214b as well as slave components 216a, 216b, and 216c upon receipt of reset signal 302. Signal 306 will in effect be used to trigger each of the components on both sides of bridge 206 to simultaneously reset. Hence, a system wide reset event is established. However, having a system wide reset event may be unnecessarily disruptive when only some of the components in a system need to be reset. The programmable chip environment in particular often specifies that certain components or certain groups of components be reconfigured during implementation. After reconfiguration, the component or group of components should be reset. However, in typical programmable and nonprogrammable system on a chip implementations, reset is only possible on a system wide level. A system wide reset may be unnecessarily disruptive.

Figure 4:
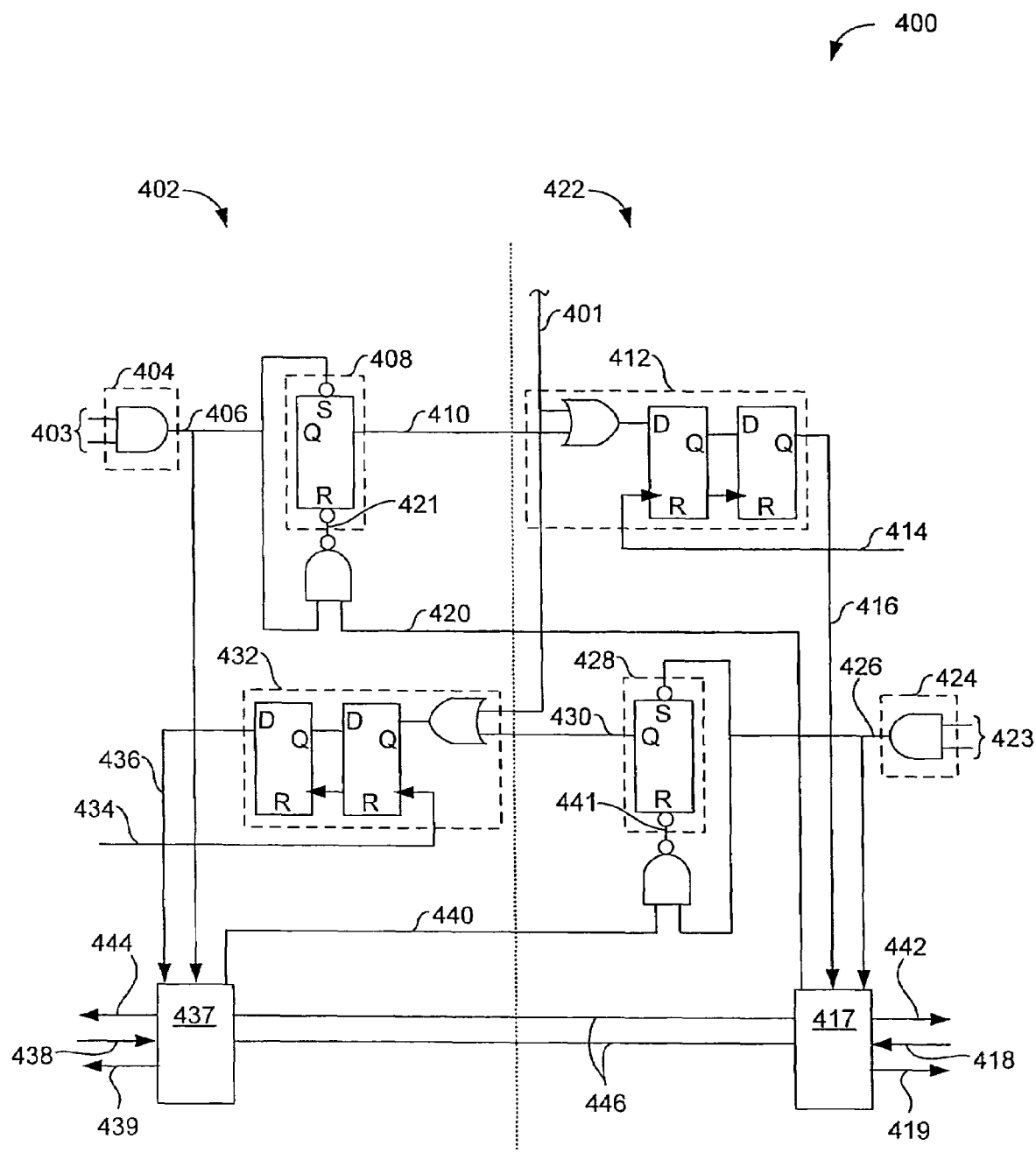
FIG. 4 is a diagrammatic representation showing a bus bridge module with synchronization logic.

FIG. 4 is a diagrammatic representation showing a bus bridge module 400 with synchronization logic that allows reset of particular components. Bus bridge module 400 is configured for independently resetting a side of a bus bridge (e.g., 206) while another side remains operating freely without violating bus protocol or locking up. In one embodiment, bus bridge module 400 is configured for receiving a reset signal on a first side of the bus bridge such that a component associated with the first side is reset while a component associated with a second side of the bus bridge continues to operate without adverse effects. In one example, the first side corresponds to a first clock domain while the second side corresponds to a second clock domain. Bus bridge module 400 is further configured for synchronizing the reset signal with the second side of the bus bridge such that a component associated with the second side can transition to an idle state.

To further elaborate, FIG. 4 illustrates bus bridge module 400 that includes logic elements that can be incorporated into system 200 for effective initialization and recovery from reset events. As shown, bus bridge module 400 is provided with a connection 401 that can be coupled to bridge 206. In one example, the logic elements are included on two separate clock domains—slave interface clock domain 402 and master interface clock domain 422; thus, mirroring the clock domains 210 and 212 respectively as presented on the two sides of bridge 206 in FIG. 2. Slave interface reset handler 404 and master interface reset handler 424 are also provided for receiving a slave interface reset input 403 and a master interface reset input 423 respectively. Other logic elements include corresponding alternating state handlers 408 and 428, synchronization logic 412 and 432, master interface 417 and slave interface 437.

Bus bridge module 400 can be best understood by dividing bus bridge module 400 into two portions and analyzing them separately. The two portions are the slave interface reset portion and the master interface reset portion. First, the slave interface reset portion includes logic elements for resetting a master component located in slave interface clock domain 402 and setting to idle a slave component located in master interface clock domain 422. As noted earlier, slave interface reset handler 404 is provided for receiving a slave interface reset input 403. Reset input 403 can be initiated in any number of ways (e.g. by a user, a predefined algorithm, a device, or an event). As shown, slave interface reset handler 404 is a logical AND gate (although other logical operators may be used as the design permits) connected to a corresponding alternating state handler 408 and slave interface 437. In one embodiment, slave interface reset handler 404 is configured to generate an output signal 406 that can be synchronously sent/received as inputs to alternating state handler 408 and slave interface 437.

Alternating state handler 408 is provided for generating, upon receipt of output signal 406, a synchronization signal 410 that is received by a master synchronization logic 412. As such, alternating state handler 408 is connectively located between slave interface reset handler 404 and master synchronization logic 412. In addition, alternating state handler 408 can be provided for terminating synchronization signal 410. By way of an example, alternating state handler 408 can be a SR-type flip flop. Hence, alternating state handler 408 (i.e., SR-type flip flop) is able to generate at Q a continuous output (e.g., synchronization signal 410) upon being set at S by an input (e.g., output signal 406) and is also able to terminate subsequently the continuous output upon being reset at R by another signal (e.g., confirmation signal 421 as will be discussed below).

On the other hand, slave interface 437 is arranged for initializing or confirming a reset/idle state of corresponding master components (e.g., 214a, 214b), associated bus structures, or slave interface 437 itself. The initializing or confirming is performed upon the receipt of output signal 406 or/and the receipt of an initialization idle signal 436. Furthermore, it is done through inputs 438, outputs 439, flush signal 444, or confirmation idle signal 440. Slave interface 437 is also arranged for communicating with master interface 417 via signal lines 446.

Master synchronization logic 412 is connectively located between alternating state handler 408 and master interface 417. Any master synchronization logic 412 may be used that is suitable for synchronizing between the clock domains present on each side of the bus bridge so that the components on one side may be safely and effectively reset independently of the components on the other side. In one embodiment, master synchronization logic 412 is configured for receiving synchronization signal 410 from alternating state handler 408 and generating an initialization idle signal 416 to master interface 417. However, it is important to note that initialization idle signal 416 is generated only upon proper synchronization of reset input 403 with master interface clock domain 422. That is, initialization idle signal 416 is generated upon synchronizing with a clock input 414 from master interface clock domain 422 that is running. Therefore, if master interface clock domain 422 is not running, initialization idle signal 416 will not be generated until a running condition is indicated.

One of the many advantages of having master synchronization logic 412 is to accommodate for the different conditions of master interface clock domain 422. For example, as noted above, master interface clock domain 422 could either be running or not running. Master interface clock domain 422 could also be clocked either synchronously or asynchronously with slave interface clock domain 402. Conventionally, if a reset of one side of a bus bridge occurs during a transaction, then the other side of the bridge may hang up waiting for the transaction to complete, which may not happen since one side of the bridge is reset. Therefore, it is not sufficient to simply reset both sides of the bus bridge since this may violate the bus protocol on the side of the bus bridge that was not originally reset. Additionally, when the master and slave are in different clock domains, a reset of either side must be long enough to be correctly sampled in the other clock domain. Furthermore, reset of either side of the bridge must function correctly regardless of whether the clock on either side is running. In any of these cases, master synchronization logic 412 allows the ability to perform the proper synchronization needed in the present invention.

Finally, as indicated above, master interface 417 is connected to master synchronization logic 412. Master interface 417 is arranged for initializing or confirming a reset/idle state of corresponding slave components (e.g., 216a, 216b, 216c), associated bus structures, or master interface 417 itself. The initializing or confirming is performed upon the receipt of an output signal 426 or/and the receipt of initialization idle signal 416. Furthermore, it is done through inputs 418, outputs 419, flush signal 442, or confirmation idle signal 420. Master interface 417 is also arranged for communicating with slave interface 437 via signal lines 446.

Now, the master interface reset portion of the bus bridge module 400 will be discussed. Much of the logic elements for the master interface reset portion will be similar in arrangement or functionality as those discussed above for the slave interface reset portion. The master interface reset portion of the bridge includes logic elements for resetting a slave component located in master interface clock domain 422 and setting to idle a master component located in slave interface clock domain 402. As noted earlier, master interface reset handler 424 is provided for receiving a master interface reset input 423. Reset input 423 can also be initiated in any number of ways (e.g. by a user, a predefined algorithm, a device, or an event). As shown, master interface reset handler 424 is a logical "AND" gate (although other logical operators may be used as the design permits) connected to a corresponding alternating state handler 428 and master interface 417. In one embodiment, master interface reset handler 424 is configured to generate an output signal 426 that can be synchronously sent/received as inputs to alternating state handler 428 and master interface 417.

Alternating state handler 428 is provided for generating, upon receipt of output signal 426, a synchronization signal 430 that is received by a slave synchronization logic 432. As such, alternating state handler 428 is connectively located between master interface reset handler 424 and slave synchronization logic 432. In addition, alternating state handler 428 can be provided for terminating synchronization signal 430. By way of an example, alternating state handler 428 can be a SR-type flip flop. Hence, alternating state handler 428 (i.e., SR-type flip flop) is able to generate at Q a continuous output (e.g., synchronization signal 430) upon being set at S by an input (e.g., output signal 426) and is also able to terminate subsequently the continuous output upon being reset at R by another signal (e.g., confirmation signal 441 as will be discussed below).

Referring back to FIG. 4, slave synchronization logic 432 is connectively located between alternating state handler 428 and slave interface 437. Any slave synchronization logic 432 may be used that is suitable for synchronizing between the clock domains present on each side of the bus bridge so that the components on one side may be safely and effectively reset independently of the components on the other side. In one embodiment, slave synchronization logic 432 is configured for receiving synchronization signal 430 from alternating state handler 428 and generating an initialization idle signal 436 to slave interface 437. However, it is important to note that initialization idle signal 436 is generated only upon proper synchronization of reset input 423 with slave interface clock domain 402. That is, initialization idle signal 436 is generated upon synchronizing with a clock input 434 from slave interface clock domain 402 that is running. Therefore, if slave interface clock domain 402 is not running, initialization idle signal 436 will not be generated until a running condition is indicated.

One of the many advantages of having slave synchronization logic 432 is to accommodate for the different conditions of slave interface clock domain 432. For example, as noted above, slave interface clock domain 402 could either be running or not running. Slave interface clock domain 402 could also either be clocked synchronously or asynchronously with master interface clock domain 422. In any of these cases and similar to master synchronization logic 412, slave synchronization logic 432 allows the ability to perform the proper synchronization needed in the present invention.

It will be appreciated by those skilled in the art that other configurations of the bridge bus module 400 can be formed. For example, some of the logical elements shown in FIG. 4 may be replaced, removed, or rearranged to achieve the independent resetting of components on either side of a bus bridge (e.g., 206) without locking up the system or violating corresponding bus protocols.

Methodology for Handling Reset Events

FIGS. 5-8 are process flow diagrams depicting specific examples of techniques for handling resets at a bus bridge. Although the specific examples depicted are illustrative, they should not be construed as limiting the techniques of the present invention to any particular process flow. The techniques of the present invention provide mechanisms for allowing both the reset of specific components in a system without adversely affecting other components and the synchronization of a reset signal across disparate clock domains. In one example, a bus bridge couples a master component running in a first clock domain to a slave component running in a second clock domain. The bus bridge interface coupled to the master component is referred to herein as the bus bridge slave interface. In some instances, the bus bridge slave interface operates so that the master component believes the bus bridge slave interface is the slave component. The bus bridge interface coupled to the slave component is referred to herein as the bus bridge master interface. In some instances, the bus bridge master interface operates so that the slave component believes the bus bridge master interface is the master component.

According to various embodiments, a master component is operating with a bus protocol that does not allow the reset of individual slave components. A bus bridge master interface receives a reset signal associated with the reset of a slave component. A master component continues operation, unaware that the slave component has been reset. If no mechanisms for handling resets are provided in a bus bridge, a master component will stall when it attempts to interact with the slave component. In some instances, the master component will wait indefinitely for data that may never arrive. In other instances, erroneous data will be introduced by the unexpected reset of the slave component. Many conventional bus protocols do not allow for the reset of individual components and consequently do not have reset handling mechanisms for other components continuing to operate in the system.

Consequently, the techniques of the present invention provide a bus bridge with mechanisms for generating bus protocol compliant signals when an operating component attempts to communicate with a reset component. For example, after the slave component reset signal (e.g., output signal 426 via master interface reset handler 424) is received by the bus bridge master interface, the bus bridge slave interface is set to an idle state. When a master component attempts to communicate with the slave component, the bus bridge slave interface sends a bus protocol compliant signal to the master component. Any signal recognized by a component supporting a particular bus protocol is referred to herein as a bus protocol compliant signal. In one example, the bus protocol compliant signal is a bus error signal. Although a bus error signal is not particularly desirable, a master component will not stall, violate its bus protocol, or malfunction upon receiving the signal. The response remains within the supported bus protocol. A slave component can be reset while the master component continues to operate.

If a reset of the master component is also desired, a resetting sequence can similarly be applied where a master component reset signal (e.g., output signal 406 via slave interface reset handler 404) is generated and received by the bus bridge master interface and where the bus bridge slave interface is set to an idle state. In one embodiment, the resetting sequence for the master component may be commonly initiated by the same resetting signal as the resetting sequence of the slave component (e.g., 423).

Figure 5:
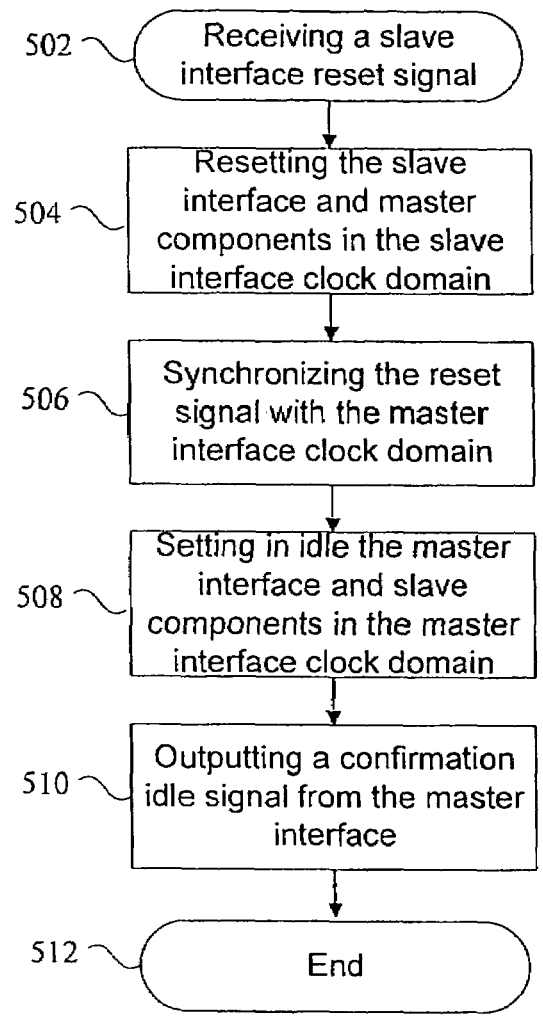
FIG. 5 is a process flow diagram showing use of a bus bridge module with synchronization logic when a slave component reset signal is received.

FIG. 5 is a process flow diagram 500 showing use of bus bridge module 400 when slave component reset signal 403 is received. Generally, process flow diagram 500 illustrates a technique for independently and safely resetting a side of a bus bridge. The technique includes receiving a reset signal on a first side of the bus bridge such that a component associated with the first side is reset while a component associated with a second side of the bus bridge continues operating without adverse effects. The technique also includes mechanisms for synchronizing the reset signal with the second side of the bus bridge such that a component associated with the second side can transition to an idle state. The first side corresponds to a first clock domain and the second side corresponds to a second clock domain.

At operation 502, bus bridge module 400 receives at slave interface reset handler 404 slave interface reset signal 403. Upon the receipt of slave interface reset signal 403, slave interface reset handler 404 generates output signal 406 that is synchronously sent/received as inputs to alternating state handler 408 and slave interface 437. Thereafter, the resetting of slave interface 437 and corresponding master components (e.g., 214a, 214b) in the slave interface clock domain is performed at operation 504. Operation 504 may include slave interface 437 transitioning all slave interface outputs 439 to their idle state. Preferably, other logic connected to slave interface 437 (e.g., bus masters and, possibly, other slaves) is also reset at the same time such that slave interface inputs 438 also transition to their idle state. Here, inputs 438 and outputs 439 can be used to connect corresponding master components. Also included in operation 504 may be the resetting of slave interface's write buffer write pointer and read buffer read pointer. In essence, one side of bus bridge 206 is now reset. In one embodiment, however, no attempt is made to adhere to the corresponding bus protocol (e.g., AHB bus protocol) while performing operation 504.

Next, operation 506 is performed for synchronizing reset signal 403 with master interface clock domain 422. Operation 506 can be initiated and terminated using any available mechanism. For example, alternating state handler 408 (e.g., SR-type flip flop) as discussed in FIG. 4 can be provided. In particular, upon the receipt of output signal 406, alternating state handler 408 generates synchronization signal 410 and sends it to master synchronization logic 412. Synchronization signal 410 can later be terminated upon alternating state handler 408 receiving confirmation signal 421, which will be discussed further below.

Master synchronization logic 412 is used in operation 506 for further synchronizing reset signal 403 with master interface clock domain 422. Master synchronization logic 412 is located in master interface clock domain 422 and includes an input for receiving synchronization signal 410, an input for receiving clock input 414 from master interface clock domain 422, and an output for sending initialization idle signal 416 to master interface 417. As previously indicated, initialization idle signal 416 will not be generated until master interface clock domain 422 is sensed running by master synchronization logic 412 via clock input 414. In one embodiment, several slave clocks cycles may even elapse before initialization idle signal 416 is generated. In essence, operation 506 includes having reset signal 403 synchronized to master interface clock domain 422 and using reset signal 403 to initiate a request for master interface 417 to transition to its idle condition as soon as possible.

After synchronizing reset signal 403 with master interface clock domain 422, operation 508 can be performed for setting in idle master interface 417 and slave components (e.g., 216a, 216b, 216c) that reside in master interface clock domain 422. Generally, operation 508 causes outputs 419 to transition to their idle state as soon as possible without violating the bus protocol. This may be as simple as setting outputs 419 to their idle state immediately or waiting for a transaction currently in progress to be acknowledged by the slave component before doing so. Further elaboration regarding operation 508 is provided in FIG. 7 and below.

When master interface 417 has transitioned to the idle state in operation 508, outputting a confirmation idle signal 420 from master interface 417 can be performed in operation 510. Confirmation idle signal 420 is then combined using an AND operation with output signal 406 to generate confirmation signal 421, which is then used as input to alternating state handler 408. Confirmation signal 421 can be used to terminate synchronization signal 410. For example, confirmation signal 421 may reset at R a SR-type flip flop, thereby terminating the output at Q. The resetting of one side of bus bridge 206 and the transitioning to an idle state for another side of bus bridge 206 are now complete. Finally, process flow diagram 500 ends at operation 512

Figure 6:
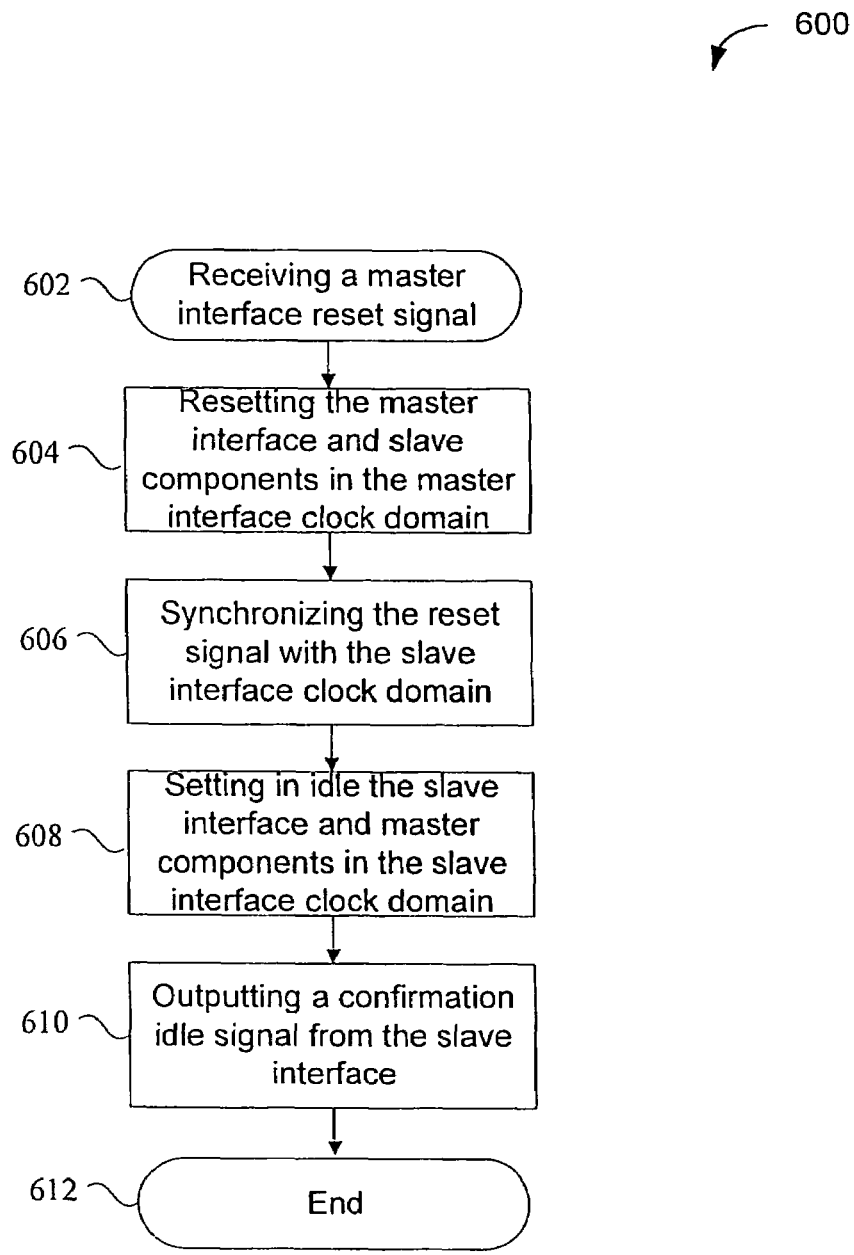
FIG. 6 is a process flow diagram showing use of a bus bridge module with synchronization logic when a master component reset signal is received.

Similarly, FIG. 6 is a process flow diagram 600 showing use of bus bridge module 400 when master interface reset signal 423 is received. Starting at operation 602, bus bridge module 400 receives at master interface reset handler 424 master interface reset signal 423. Upon the receipt of master interface reset signal 423, master interface reset handler 424 generates output signal 426 that is synchronously sent/received as inputs to alternating state handler 428 and master interface 417. Thereafter, the resetting of master interface 417 and corresponding slave components (e.g., 216a, 216b, 216c) in the master interface clock domain is performed at operation 604. Operation 604 may include master interface 417 transitioning all master interface outputs 419 to their idle state. Preferably, other logic connected to master interface 417 (e.g., bus slaves and, possibly, other masters) is also reset at the same time such that master interface inputs 418 also transition to their idle state. Here, inputs 418 and outputs 419 can be used for coupling to corresponding slave components. Also included in operation 604 may be the resetting of master interface's write buffer read pointer and read buffer write pointer. In essence, one side of bus bridge 206 is now reset. In one embodiment, however, no attempt is made to adhere to the corresponding bus protocol (e.g., AHB bus protocol) while performing operation 604.

Next, operation 606 is performed for synchronizing reset signal 423 with slave interface clock domain 402. Operation 606 can be initiated and terminated using any available mechanism. For example, alternating state handler 428 (e.g., SR-type flip flop) as discussed in FIG. 4 can be provided. In particular, upon the receipt of output signal 426, alternating state handler 428 generates synchronization signal 430 and sends it to slave synchronization logic 432. Synchronization signal 430 can later be terminated upon alternating state handler 428 receiving confirmation signal 441, which will be discussed further below.

Slave synchronization logic 432 is used in operation 606 for further synchronizing reset signal 423 with slave interface clock domain 402. Slave synchronization logic 432 is located in slave interface clock domain 402 and includes an input for receiving synchronization signal 430, an input for receiving clock input 434 from slave interface clock domain 402, and an output for sending initialization idle signal 436 to slave interface 437. As previously indicated, initialization idle signal 436 will not be generated until slave interface clock domain 402 is sensed running by slave synchronization logic 432 via clock input 434. In one embodiment, several master clocks cycles may even elapse before initialization idle signal 436 is generated. In essence, operation 606 includes having reset signal 423 synchronized to slave interface clock domain 402 and using reset signal 423 to initiate a request for slave interface 437 to transition to its idle condition as soon as possible.

After synchronizing reset signal 423 with slave interface clock domain 402, operation 608 can be performed for setting in idle slave interface 437 and master components (e.g., 214a, 214b) that reside in slave interface clock domain 402. Generally, operation 608 involves slave interface 437 transitioning to an idle state as soon as possible without violating the bus protocol, e.g. by asserting a bus error back to the master component. Further elaboration regarding operation 608 is provided in FIG. 8 and below.

When slave interface 437 has reached its idle state in operation 608, outputting a confirmation idle signal 440 from slave interface 437 can be performed in operation 610. Confirmation idle signal 440 is then combined with an AND operation with output signal 426 to generate confirmation signal 441, which is then used as an input to alternating state handler 428. Confirmation signal 441 can be used to terminate synchronization signal 430. For example, confirmation signal 441 may reset at R a SR-type flip flop, thereby terminating the output at Q. The resetting of one side of bus bridge 206 and the transitioning to an idle state for another side of bus bridge 206 are now complete. Finally, process flow diagram 600 ends at operation 612.

Figure 7:
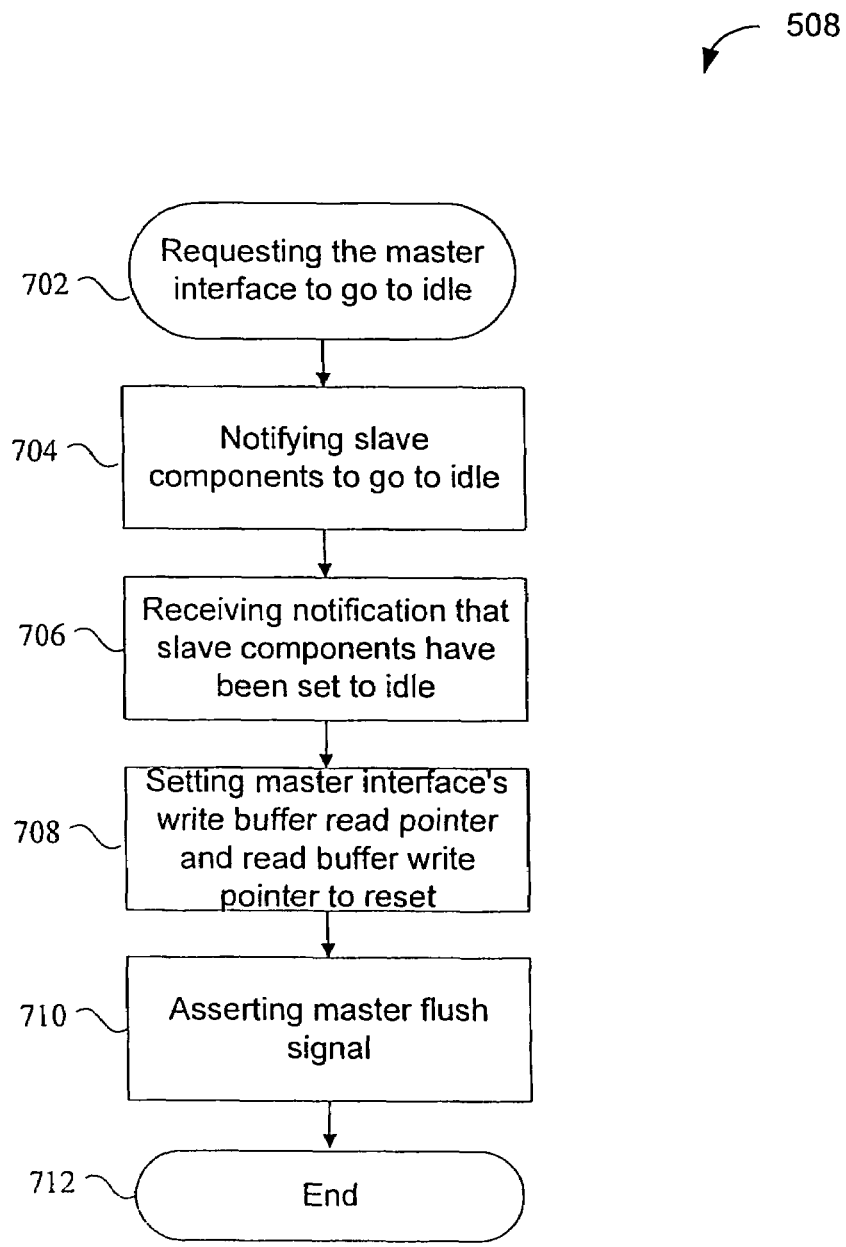
FIG. 7 is a process flow diagram showing the idle setting of the master interface and slave components in the master interface clock domain.

FIG. 7 is a process flow diagram of operation 508 showing the setting in idle of master interface 417 and slave components (e.g., 216a, 216b, and 216c) in master interface clock domain 422. Generally, the way the idle state is reached depends upon the bus protocol present. In one example, a simple asynchronous bus may reach the idle state by simply negating an address strobe signal. In another example, as with the AMBA bus mentioned earlier, the master interface is not allowed to change the state of its outputs (e.g., 419) until it receives an acknowledgement from the slave component involved in a transaction. This acknowledgement generally indicates/confirms when the slave component is ready to be set in idle. As such, any suitable condition or state of the slave component may be used for this purpose. Preferably, however, the condition or state of the slave component is selected such that the loss of information from the transaction is minimized. In one embodiment, an attempt is made to adhere to the corresponding bus protocol (e.g., AHB bus protocol) while performing operation 508.

Beginning at operation 702, requesting the master interface to go to idle is performed. Generally, any form of request may be used. For example, initialization idle signal 416 may be used for this purpose. Upon requesting master interface to go to idle, notifying slave components to go to idle is performed in operation 704. Operation 704 may include master interface 417 transitioning all master interface outputs 419 to their idle state. Next, operation 708 is performed for setting master interface's write buffer read pointer and read buffer write pointer to reset.

It should be noted that flushing the read and write buffers may cause loss of data in the system. Nonetheless, flushing the read and write buffers is preferable to performing a system wide reset, particular when debugging particular components implemented on a programmable system on a chip. Thus, master interface 417 can assert a master flush signal 442 in operation 710. In general, master flush signal 442 is used to signal to all slaves that there has been a reset initiated and for each of them to flush data out of their buses as necessary. Operation 710 is application and system dependent. For example, within Altera's Excalibur line of devices, master interface 417 will assert master flush signal 442 for one clock cycle to signal to the PLD logic that master interface 417 is transitioning to an idle state. Master flush signal 442 is used by a SDRAM controller connected to the PLD-to-MPU bridge(s) in order to clear any pre-fetched read data for split transactions that will not now complete. Finally, operation 508 ends with operation 712.

Figure 8:
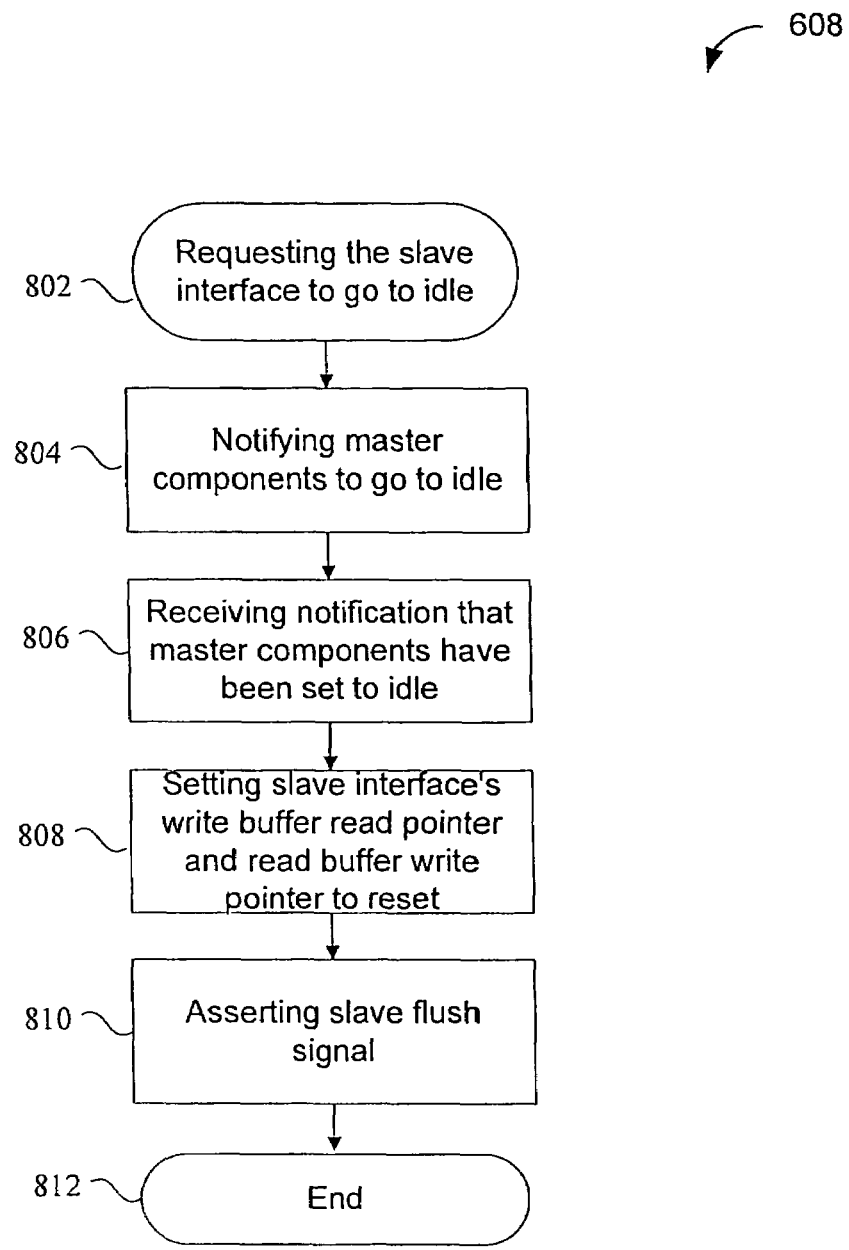
FIG. 8 is a process flow diagram showing the idle setting of the slave interface and master components in the slave interface clock domain.

FIG. 8 is a process flow diagram of operation 608 showing the setting in idle of slave interface 437 and master components (e.g., 214*a*, 214*b*) in slave interface clock domain 402. In one embodiment, an attempt is made to adhere to the corresponding bus protocol (e.g., AHB bus protocol) while performing operation 608. For example, slave interface 437 immediately asserts an "ERROR" response on master_hresp if any transaction is in progress. Any transaction that starts while the bridge is in reset will also be terminated with an "ERROR" response (e.g., bus protocol compliant signal).

Beginning at operation 802, requesting slave interface to go to idle is performed. Generally, any form of request may be used. For example, initialization idle signal 436 may be used for this purpose. Upon requesting slave interface to go to idle, notifying master components to go to idle is performed in operation 804. Operation 804 may include slave interface 437 transitioning all slave interface outputs 439 to their idle state.

Next, operation 808 is performed for setting slave interface's write buffer write pointer and read buffer read pointer to reset. Afterwards, slave interface 437 can assert a slave flush signal 444 in operation 810. In general, slave flush signal 444 is used to signal to all masters that there has been a reset initiated and for each of them to flush data out of their buses as necessary. For example, slave flush signal 444 can be asserted for one clock cycle to signal to the PLD logic that slave interface 437 is transitioning to an idle state. Operation 810 is application and system dependent. Finally, operation 608 ends with operation 812.

In one embodiment, operation 608 allows slave interface 437 to un-split all outstanding split transactions. When these transactions are attempted again, they will be terminated with a bus error if the master component is still disabled or otherwise proceed normally.

Application

"While the methods, apparatus, and computer program products of this invention are applicable to any electronic design or target hardware device, they find particular value in the context of programmable logic devices (PLDs). As mentioned, a PLD is a programmable integrated circuit that allows the user of the circuit, using software control; to customize the logic functions the circuit will perform. Examples of PLDs are FPGAs (Field Programmable Gate Arrays) and EPLDs (Erasable Programmable Logic Devices). The logic functions previously performed by small, medium and large-scale integration integrated circuits can instead be performed by programmable logic devices. As indicated, programmable logic devices supplied by integrated circuit manufacturers like Altera Corporation are not inherently capable of performing any specific action. The user, in conjunction with software supplied by the PLD manufacturer, can program the PLD to perform the specific function or functions required by the user's application. The PLD then can function in a larger system designed by the user, just as though dedicated logic chips were employed."

A typical PLD includes an array of logic cells that can be individually programmed and arbitrarily interconnected to each other to provide internal input and output signals, thus permitting the performance of complex combinational and sequential logic functions. The program is implemented in the PLD by setting the states of programmable elements such as memory cells. These memory cells may be implemented with volatile memories, such as SRAMs, which lose their programmed states upon termination of power to the system. If the programmable elements used are volatile memories, the memory cells must be configured upon each system power-up in order to configure the PLD.

The foregoing describes the instant invention and its presently preferred embodiments. Numerous modifications and variations in the practice of this invention are expected to occur to those skilled in the art. For instance, the present invention may be used whenever any two sides are running in their own clock domain and a safe independent reset of either side is required. Although many of the components and processes are described above in the singular for convenience, it will be appreciated by one of skill in the art that multiple components and repeated processes can also be used to practice the techniques of the present invention. Therefore, the described embodiments should be taken as illustrative and not restrictive, and the invention should not be limited to the details given herein but should be defined by the following claims and their full scope of equivalents.

What is claimed is:

1. A method for independently resetting a side of a bus bridge, the method comprising:

receiving a reset signal on a first side of the bus bridge and not on a second side of said bus bridge;

resetting a first component associated with the first side of said bus bridge and not resetting a second side of said bus bridge, wherein receiving the reset signal includes synchronously receiving the reset signal at both an interface and an alternating state handler, the interface coupling the first side component to the bus bridge and the alternating state handler being associated with the first side;

sending a signal to a second component associated with said second side of the bus bridge after receiving said reset signal, said signal being compliant with a bus protocol of said second side;

continuing to operate said second component associated with said second side of the bus bridge while resetting said first component without violating said bus protocol of said second side, wherein the first side corresponds to a first clock domain and the second side corresponds to a different second clock domain; and synchronizing the reset signal with the second side of the bus bridge such that a component associated with the second side transitions to an idle state.

2. The method as recited in claim 1, wherein receiving the reset signal includes:

receiving the reset signal at an interface, the interface coupling the first component to the bus bridge.

3. The method as recited in claim 1, wherein both the components are implemented in programmable logic.

4. The method as recited in claim 1, wherein one of the components is implemented in hard logic.

5. The method as recited in claim 1, wherein synchronizing the reset signal includes:

receiving a synchronization signal by synchronization logic, the synchronization signal being a result of the reset signal;

receiving a clock input by the synchronization logic, the clock input associated with the second clock domain; and outputting an initialization idle signal when the received clock input indicates that the second clock domain is running.

6. The method as recited in claim 1, wherein either the first component associated with the first side or the second component associated with the second side is implemented in programmable logic on a programmable device.

7. The method as recited in claim 6, wherein the programmable device is selected from the group consisting of a PLD, a PLA, a PAL, a FPGA, and a CPLD.

8. The method as recited in claim 1 wherein said received reset signal is not associated with a system-wide reset.

9. A method for independently resetting a side of a bus bridge, the method comprising:

receiving a reset signal on a first side of the bus bridge such that a component associated with the first side is reset while a component associated with a second side of the bus bridge continues operating without violating bus protocols, the first side corresponding to a first clock domain and the second side corresponding to a second clock domain, wherein receiving the reset signal includes synchronously receiving the reset signal at both an interface and an alternating state handler, the interface coupling the first side component to the bus bridge and the alternating state handler being associated with the first side.

10. The method as recited in claim 9, wherein the alternating state handler is an SR type flip-flop.

11. A method for independently resetting a side of a bus bridge, the method comprising:

receiving a reset signal on a first side of the bus bridge such that a component associated with the first side is reset while a component associated with a second side of the bus bridge continues operating without violating bus protocols, the first side corresponding to a first clock domain and the second side corresponding to a second clock domain; and synchronizing the reset signal with the second side of the bus bridge such that a component associated with the second side can transition to an idle state, wherein synchronizing the reset signal includes:

receiving a synchronization signal by synchronization logic, the synchronization signal being a result of the reset signal;

receiving a clock input by the synchronization logic, the clock input associated with the second clock domain; and outputting an initialization idle signal when the received clock input indicates that the second clock domain is running;

receiving the initialization idle signal by an interface configured for coupling to the component associated with the second side of the bridge; and outputting a component idle signal to the component associated with the second side of the bridge in response to receiving the initialization idle signal, the component idle signal being used to trigger the component associated with the second side of the bridge to transition to the idle state.

12. The method as recited in claim 11, further comprising:

outputting a confirmation idle signal from the interface, the confirmation idle signal provided to indicate when the component associated with the second side of the bridge has reached the idle state.

13. The bus bridge as recited in claim 11, wherein the bus bridge is implemented on a programmable device.

14. The bus bridge as recited in claim 13, wherein the programmable device is selected from the group consisting of a PLD, a PLA, a PAL, a FPGA, and a CPLD.

15. The bus bridge as recited in claim 11, wherein the bus bridge slave interface is configured to interact with the master component on the second side of the bus bridge such that the slave component is reset while the master component continues operating without stalling.

16. The method as recited in claim 11, wherein the bus bridge slave interface is configured to interact with the master component on the second side of the bus bridge such that the slave component is reset while the master component continues operating without locking up.

17. The bus bridge as recited in claim 11 wherein said received reset signal is not associated with a system-wide reset.

18. A bus bridge for handling resets, the bus bridge comprising:

a bus bridge master interface, the bus bridge master interface coupled to a slave component, the bus bridge master interface configured to receive a reset signal associated with a reset of the slave component on a first side of the bus bridge;

a bus bridge slave interface, the bus bridge slave interface coupled to a master component, the bus bridge slave interface configured to interact with the master component on a second side of the bus bridge such that the slave component is reset while the master component continues operating without violating bus protocols; and an alternating state handler being associated with the first side, wherein both the bus bridge master interface and the alternating state handler are configured for synchronously receiving the reset signal on the first side of the bus bridge.

19. The bus bridge as recited in claim 18, wherein the alternating state handler is a SR type flip-flop.

20. The bus bridge as recited in claim 18, wherein both the components are implemented in programmable logic.

21. The bus bridge as recited in claim 18, wherein one of the components is implemented in hard logic.

22. The bus bridge as recited in claim 18, wherein the synchronization logic is configured for receiving a synchronization signal that is a result of the reset signal; for receiving a clock input that is associated with the second clock domain; and for outputting an initialization idle signal when the received clock input indicates that the second clock domain is running.

23. A bus bridge for handling resets, the bus bridge comprising:
- a bus bridge master interface, the bus bridge master interface coupled to a slave component, the bus bridge master interface configured to receive a reset signal associated with a reset of the slave component on a first side of the bus bridge;
- a bus bridge slave interface, the bus bridge slave interface coupled to a master component, the bus bridge slave interface configured to interact with the master component on a second side of the bus bridge such that the slave component is reset while the master component continues operating without violating bus protocols, wherein the first side corresponds to a first clock domain and the second side corresponds to a second clock domain, the first and second clock domains being different from each other;
- a synchronization logic for synchronizing the reset signal with the second clock domain such that the master component and the bus bridge slave interface transition to an idle state, wherein the synchronization logic is configured for receiving a synchronization signal that is a result of the reset signal; for receiving a clock input that is associated with the second clock domain; and for outputting an initialization idle signal when the received clock input indicates that the second clock domain is running,
- wherein the bus bridge slave interface is configured for receiving the initialization idle signal; and for outputting a component idle signal to the master component in response to receiving the initialization idle signal, the component idle signal being used to trigger the master component to transition to an idle state.

24. The bus bridge as recited in claim 23, wherein the bus bridge slave interface is further configured for outputting a confirmation idle signal that is used to indicate when the master component has reached an idle state.

* * * * *